(12) United States Patent
Hendrickson et al.

(10) Patent No.: US 8,915,742 B2
(45) Date of Patent: *Dec. 23, 2014

(54) SIMULATED TISSUE, BODY LUMENS AND BODY WALL AND METHODS OF MAKING SAME

(71) Applicant: Colorado State University Research Foundation, Fort Collins, CO (US)

(72) Inventors: Dean A. Hendrickson, Fort Collins, CO (US); Fausto Bellezzo, Fort Collins, CO (US)

(73) Assignee: Colorado State University Research Foundation, Fort Collins, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 14/083,862

(22) Filed: Nov. 19, 2013

(65) Prior Publication Data

US 2014/0072941 A1   Mar. 13, 2014

Related U.S. Application Data

(63) Continuation of application No. 13/091,873, filed on Apr. 21, 2011, now Pat. No. 8,613,621.

(60) Provisional application No. 61/364,740, filed on Jul. 15, 2010, provisional application No. 61/364,906, filed on Jul. 16, 2010.

(51) Int. Cl.
*G09B 23/28* (2006.01)
*G09B 23/30* (2006.01)

(52) U.S. Cl.
CPC .............. *G09B 23/28* (2013.01); *G09B 23/303* (2013.01); *G09B 23/30* (2013.01)
USPC ......................................................... 434/267

(58) Field of Classification Search
USPC .................................. 434/262, 267, 268, 272
See application file for complete search history.

(56) References Cited

U.S. PATENT DOCUMENTS

| 5,425,644 | A | * | 6/1995 | Szinicz | 434/268 |
| 5,620,326 | A | * | 4/1997 | Younker | 434/268 |
| 5,803,746 | A | * | 9/1998 | Barrie et al. | 434/267 |
| 5,951,301 | A | | 9/1999 | Younker | |
| 6,488,507 | B1 | | 12/2002 | Stoloff et al. | |
| 6,997,719 | B2 | * | 2/2006 | Wellman et al. | 434/272 |
| 7,272,766 | B2 | | 9/2007 | Sakezles | |
| 7,427,199 | B2 | | 9/2008 | Sakezles | |
| 7,507,092 | B2 | | 3/2009 | Sakezles | |

(Continued)

OTHER PUBLICATIONS

Non-Final Office Action, U.S. Appl. No. 14/201,313, dated Aug. 27, 2014.

(Continued)

*Primary Examiner* — Kurt Fernstrom
(74) *Attorney, Agent, or Firm* — Polsinelli PC

(57) ABSTRACT

An artificial body wall is disclosed herein. The artificial body wall may include a first layer and a second layer. The first layer is substantially formed of a silicone rubber and includes at least one of an artificial epidermis-dermis layer or an artificial subcutaneous layer. The second layer extends along and below the first layer and is substantially formed of a silicone rubber. The second layer includes at least one of an artificial fascia layer or an artificial muscle layer. At least one of the first layer or second layer may be vascularized.

29 Claims, 10 Drawing Sheets

(56) References Cited

U.S. PATENT DOCUMENTS

| | | | |
|---|---|---|---|
| 7,519,209 B2 | 4/2009 | Dawant et al. | |
| 7,549,866 B2 * | 6/2009 | Cohen et al. | 434/267 |
| 7,677,897 B2 | 3/2010 | Sakezles | |
| 7,699,615 B2 | 4/2010 | Sakezles | |
| 7,857,626 B2 * | 12/2010 | Toly | 434/267 |
| 7,862,339 B2 * | 1/2011 | Mulligan | 434/268 |
| 7,931,471 B2 * | 4/2011 | Senagore et al. | 434/267 |
| 8,100,695 B2 * | 1/2012 | Duprez et al. | 434/268 |
| 8,297,982 B2 * | 10/2012 | Park et al. | 434/262 |
| 2007/0077544 A1 * | 4/2007 | Lemperle et al. | 434/262 |
| 2011/0052028 A1 | 3/2011 | Shreiber | |
| 2014/0186809 A1 | 7/2014 | Hendrickson et al. | |

OTHER PUBLICATIONS

Response to Non-Final Office Action, U.S. Appl. No. 14/201,313, dated Sep. 23, 2014.

* cited by examiner

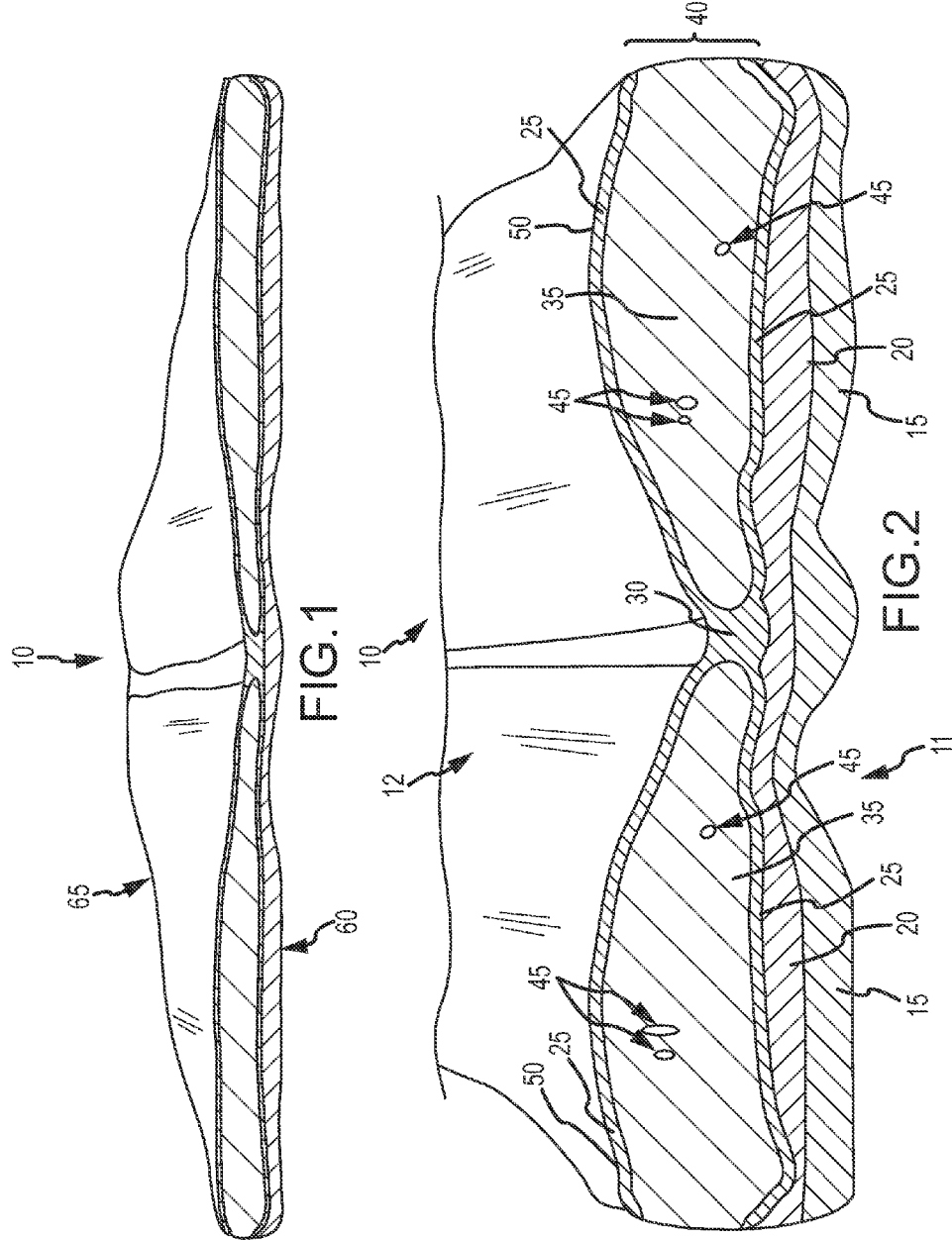

US 8,915,742 B2

SIMULATED TISSUE, BODY LUMENS AND BODY WALL AND METHODS OF MAKING SAME

CROSS REFERENCE TO RELATED APPLICATIONS

This application is a continuation of U.S. application Ser. No. 13/091,873 filed Apr. 21, 2011, now U.S. Pat. No. 8,613, 621, which application claims the benefit under 35 U.S.C. §119(e) of: U.S. Provisional Application 61/364,740, filed Jul. 15, 2010 and titled Multilayer Artificial Abdominal Body Wall; and U.S. Provisional Application 61/364,906, filed Jul. 16, 2010 and titled Non-Medical Grade Silicone Vessels for Simulation Models. All of the applications referenced above are incorporated by reference in their entirety into the present application.

The present application is related to U.S. patent application Ser. No. 13/091,913 filed Apr. 21, 2011, now U.S. Pat. No. 8,708,707, and entitled "Surgical Simulator, Simulated Organs and Methods of Making Same", which application is incorporated by reference in its entirety into the present application.

FIELD OF THE INVENTION

The present invention relates to simulated anatomical models and methods of making such models. More specifically, the present invention relates simulated tissue, body lumens and body walls and related methods of manufacture.

BACKGROUND OF THE INVENTION

A surgical technique is learned by physically practicing the technique. For example, a student may practice making an incision and then suturing the incision on a living patient (e.g., a dog, pig, etc.), a cadaver, or a model (e.g., the backing of a carpet remnant). Each of these has it disadvantages.

For example, while practicing surgical techniques on living animals offers the advantage of actual surgical conditions, there are high associated costs due to having to obtain, take care of, and dispose of the animals. Also, societal attitudes are increasingly less favorable towards the use of animals for such purposes.

Surgical conditions with cadaver tissue are less realistic than with actual living tissue due to a lack of flowing body fluids and the physical characteristics of dead tissue. Also, there are high costs associated with obtaining, maintaining, and disposing of cadavers.

While practicing making an incision and suturing on a backing of a carpet remnant may be inexpensive and portable for the student, such a model has a poor correlation to actual tissue and can end up causing the student to develop incorrect techniques.

There is a need in the art for simulated anatomical models useable for practicing surgical techniques, wherein the simulated anatomical models overcome the above-discussed disadvantages.

BRIEF SUMMARY OF THE INVENTION

An artificial body wall is disclosed herein. In one embodiment, the artificial body wall includes a first layer and a second layer. The first layer is substantially formed of a silicone rubber and includes at least one of an artificial epidermis-dermis layer or an artificial subcutaneous layer. The second layer extends along and below the first layer and is substantially formed of a silicone rubber. The second layer includes at least one of an artificial fascia layer or an artificial muscle layer. At least one of the first layer or second layer may be vascularized.

A method of manufacturing an artificial body wall is also disclosed herein. In one embodiment, the method includes: molding a first layer substantially formed of a silicone rubber and including at least one of an artificial epidermis-dermis layer or an artificial subcutaneous layer; and after the first layer has substantially cured, causing a second layer to extend along the first layer, the second layer substantially formed of a silicone rubber and including at least one of an artificial fascia layer or an artificial muscle layer.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the spirit and scope of the present invention. Accordingly, the drawings and detailed description are to be regarded as illustrative in nature and not restrictive.

BRIEF DESCRIPTION OF THE DRAWINGS

FIG. 1 is a medial-lateral cross section of an artificial body wall representative of an abdominal wall of a animal, such as, for example, a horse.

FIG. 2 is the same view as FIG. 1, except having been substantially enlarged in an anterior-posterior direction only so as to more clearly depict the various layers forming the artificial abdominal wall.

DETAILED DESCRIPTION

Figure 3:
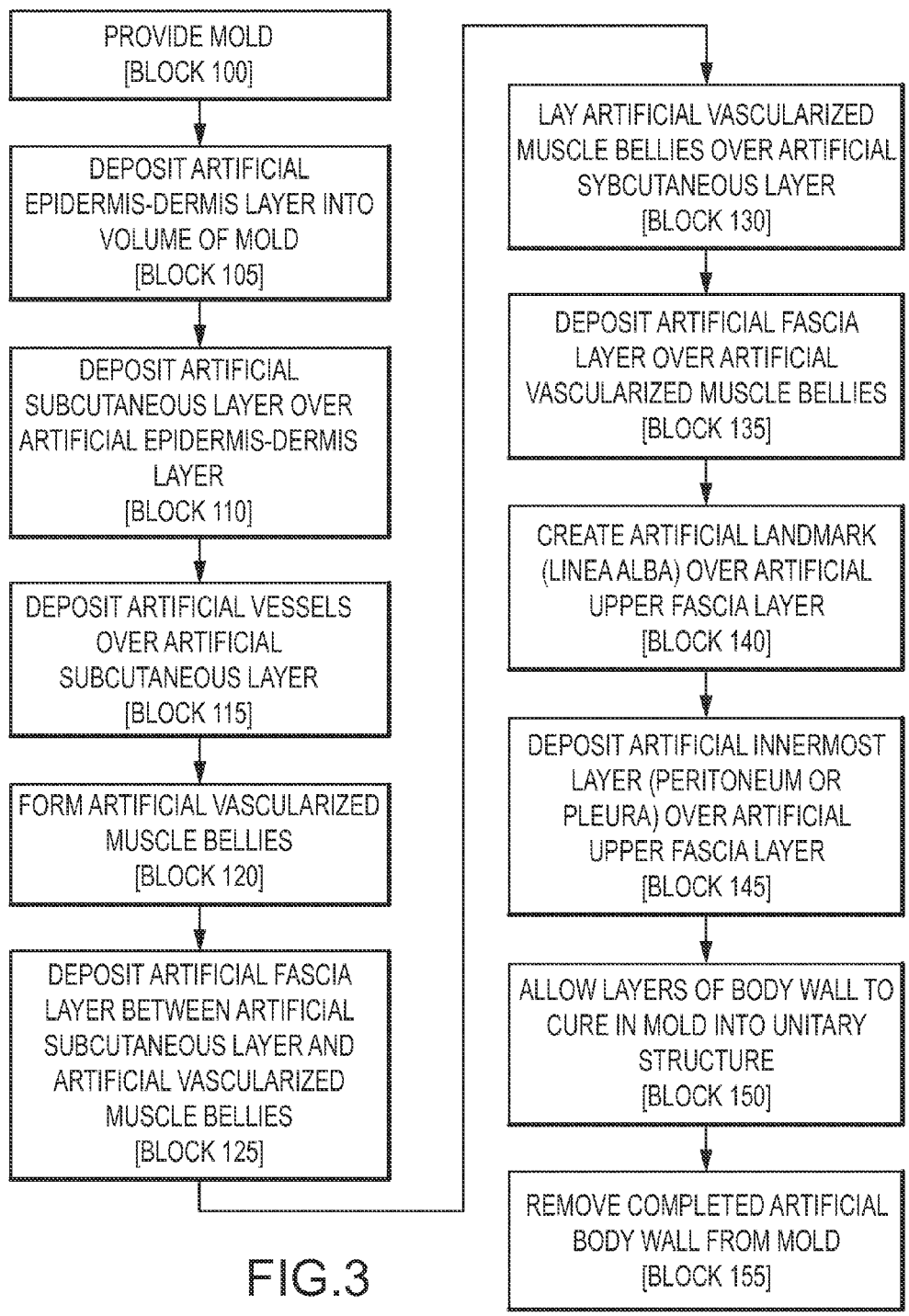
FIG. 3 is a flow chart outlining an embodiment of the manufacturing method for the artificial abdominal wall of FIGS. 1 and 2.

Artificial tissues, body lumens and body walls are disclosed herein. The artificial tissues, body lumens and body walls are advantageous because they offer a truly realistic surgical experience akin to working on a living animal.

a. Artificial Body Wall

In one embodiment, artificial tissues may be used to form an artificial anatomical structure such as an artificial body wall having a multi-layer configuration that mimics a real body wall with respect to types and order of layers, thickness of layers, tactile response, color, ability to hold a suture, and hemorrhaging when punctured or cut. For example, in one embodiment, an artificial body wall may, like a real body wall, have a multi-layer configuration including an epidermis and dermis, subcutaneous tissue or hypodermis, fascia, skeletal muscle, fat, an inner lining layer such as a peritoneum when the artificial body wall is to mimic an abdominal wall or pelvic cavity or a pleura when the artificial body wall is to mimic a thoracic cavity. Further, the artificial body wall may include a vascular system within the appropriate layers of the artificial body wall and selected anatomical details, such as, for example, a linea alba, umbilicus, rectus abdominus muscle, epigastric arteries and veins, or etc. for providing landmarks that are important for a particular surgical procedure.

For a detailed discussion of an embodiment of an artificial body wall of an animal or human, reference is made to FIGS. 1 and 2. FIG. 1 is a medial-lateral cross section of an artificial body wall 10 representative of an abdominal wall of a animal, such as, for example, a horse. FIG. 2 is the same view as FIG. 1, except having been substantially enlarged only in an anterior-posterior direction so as to more clearly depict the various layers forming the artificial abdominal wall 10.

As shown in FIGS. 1 and 2, the artificial abdominal wall 10 includes a first surface 11 that is representative of an outer surface 11 of an abdominal wall and a second surface 12 that is representative of an inner surface 12 of an abdominal wall. The outer surface 11 is defined by an outermost layer 15 of the artificial abdominal wall 10, which is representative of the epidermis and dermis. For many species of animals, and also in humans, the epidermis is a superficial, protective keratinized layer of the skin. The dermis is underneath and joined to the epidermis and is a thicker fibrous and irregular connective tissue.

For the artificial body wall 10, the epidermis-dermis layer 15 may be similar to a real epidermis-dermis layer in both appearance and physical characteristics. For example, in one embodiment, the artificial epidermis-dermis layer 15 is tear resistant, is able to hold a suture, and has limited elasticity. Also, the artificial epidermis-dermis layer 15 has a smooth finish, accurate surface detail, and realistic color and texture that closely mimics the surface of a real epidermis-dermis layer.

The artificial epidermis-dermis layer 15 can be can be shaped and colored according to the needs of the surgical technique to be practiced and to mimic the characteristics of the species and body location to be mimicked by the artificial epidermis-dermis layer 15. Example surgical skills that can be practiced on such an artificial epidermis-dermis layer 15 include suturing, creation of pedicle skin flaps for reconstructive surgery techniques, reconstructive surgery planning and performance, skin biopsy techniques, skin scrapping techniques, targeted mass removals and dissecting techniques.

The artificial epidermis-dermis layer 15 can be employed with other layers of an artificial body wall 10 in forming a body wall structure on which various surgical procedures can be practiced. For example, as indicated in FIG. 1, the epidermis-dermis layer 15 extends over, and anatomically interconnects with, a hypodermis of subcutaneous tissue layer 20. In humans, as well as in other species, the subcutaneous tissue layer is mostly adipose tissue with a portion of connective tissue. Therefore, fat is typically the main tissue represented in the subcutaneous tissue layer.

For the artificial subcutaneous layer 20, its durometer and color can be adapted as needed, depending on the intended use of the model. Similar to a real subcutaneous layer of an actual animal or human, in one embodiment, the artificial subcutaneous layer 20 is a lot less resistant to strain as compared to the artificial epidermis-dermis layer 15. Also, just like a real subcutaneous layer, the artificial subcutaneous layer 20 may be made to have a greasy, soft and compliant tactile characteristic or the tactile characteristics of a harder, denser "fat tissue". The color, thickness and locations of the artificial subcutaneous layer 20 may be tailored to a specific animal or human.

When employed in the artificial body wall 10, the artificial subcutaneous layer 20 accompanies the artificial epidermis-dermis layer 15 and has the same overall potential utilization as the artificial epidermis-dermis layer 15. Additionally, the artificial subcutaneous layer 20 can be made as thin or as thick as necessary, depending upon the function of the artificial body wall 10. An example of the advantage of such a capability would be a thicker artificial subcutaneous layer 20 that can increase the realism and the difficulty level of a specific surgical approach, when this is deemed necessary for training purposes, for example, in the case training for surgery on bariatric patients.

The fascia is a connective tissue that surrounds muscles, groups of muscles, blood vessels, and nerves, binding those structures together. As can be understood from FIG. 1, in the artificial body wall 10, the artificial fascia layer 25 has a similar function, and acts as a muscular involucrum. In one embodiment of an artificial body wall 10 that is configured to mimic an abdominal wall, the artificial body wall 10 includes a linea alba 30 that interconnects two artificial abdominal wall muscle bellies 35 of the artificial body wall 10. As mentioned above, the artificial body wall 10 can be configured to have selected anatomical details for increasing fidelity and providing landmarks that are important for a particular surgical procedure. For example, the linea alba 30 of the artificial abdominal wall 10 can serve as a landmark and as a port of entry for abdominal procedures, just as is the case in a surgical procedure on a living patient. Also, dissection can be done between the planes of the artificial facial layer 25 and approaches through the artificial linea alba 30.

Real skeletal muscle is designed as a bundle within a bundle arrangement, and the entire muscular unit is surrounded by a connective tissue called epimysium. In the artificial abdominal wall 10, the artificial fascia layer 25 surrounding the artificial rectus abdominus muscle 35 represents the epimysium.

In one embodiment, the artificial muscle-fascia unit 40 (i.e., the artificial fascia layer 25 and artificial muscle bellies 35) resembles muscular tissue but without the striated bundles. In one embodiment the artificial muscle-fascia unit 40 has a texture mimicking striated muscle without tension, which is conveniently similar to a surgical scenario where the patient is anesthetized. Like a real muscle-fascia unit in real surgical conditions, the artificial muscle-fascia unit 40 will suffer elastic deformation but to a limited degree, since a dense layer of artificial fascia 25 encapsulates the artificial muscle belly 35. Resistance to tearing is decreased for the artificial muscle-fascia unit 40, which is also something encountered in a real surgical environment. Thus, the artificial muscle-fascia unity 40 provides surgical conditions like those encountered when in a real surgical environment, allowing a student to develop the surgical techniques and finesse required to maintain tissue integrity.

As can be understood from FIG. 1, in one embodiment, vessels 45 are distributed unevenly throughout applicable portions of the artificial body wall 10, which is like the vascular distribution of the tributary vessels in muscular tissue. Depending on the body wall that artificial body wall 10 is supposed to replicate, the vascular arrangement within the artificial body wall 10 may have main veins, arteries and other vessels located in the artificial body wall 10 as would be the case with the real body wall the artificial body wall 10 is supposed to replicate. Thus, in one embodiment, the artificial body wall 10 provides a surgical training experience that is very similar to a real surgical experience. For example, artificial body wall 10 offers dissection through tissue planes and realistic surgical approaches with bleeding consequent to erroneous incisions, or purposely due to a trans-muscular approach.

As can be understood from FIG. 1, in one embodiment, the artificial body wall 10 includes an artificial innermost layer 50, which, depending on the type of body wall being represented by the artificial body wall 10, will be an artificial peritoneum layer 50 or an artificial pleura layer. In an actual patient, the peritoneum is a thin membrane that lines the abdominal and pelvic cavities (i.e., parietal peritoneum), and covers most abdominal viscera (i.e., visceral peritoneum). A similar description and distinction is given to the thin membrane that lines the inside of the thoracic cavity (i.e., parietal pleura) and the organs within the thoracic cavity (i.e., visceral pleura). These serous membranes are composed of a layer of mesothelium supported by a thin layer of connective tissue, resulting in a thin, trans-lucid layer with limited elasticity and high resistance to tearing without sharp penetration. The artificial innermost layer 50 has many, if not all, of the visual and tactile characteristics of a real peritoneum or pleura.

For a discussion regarding a method of manufacturing, and the material compositions forming, the artificial body wall and its various artificial layers, reference is made to FIG. 3, which is a flow chart outlining an embodiment of the manufacturing method. As can be understood from FIG. 2, in one embodiment, a mold 55 is provided [block 100]. In one embodiment, the mold is sculpted or machined to resemble a negative of a body wall surface the artificial body wall 10 is to replicate. In another embodiment, the mold is a result of an initial mold taken of a body wall surface of a living or deceased creature or a sculpted body wall surface. For example, a short-lived mold is created from an original that may be deceased, alive, or sculpted. A clay positive is casted utilizing the short-lived mold, the clay positive representing the original body wall surface. The clay positive is corrected as needed, in accordance to the objective of the final product. As an example, it may be desirable to have a more anatomically correct mold if the objective is the training of surgical approaches that require recognition of specific landmarks.

A polyurethane mold is then formed about the clay positive. In doing so, borders are created around the clay positive with a moldable oil based soft clay. The mold is then pulverized with a release agent and allowed to dry. A first layer of polyurethane Shore A 30 is then poured or painted over the clay positive, followed by a minimum of three and a maximum of five layers of the same material, which are reinforced with polyester fibers. A period of 15-20 minutes is allowed to elapse between layers of polyurethane. Once all layers of polyurethane are laid up, the polyurethane mold is left to completely cure for a period of 24 hours prior to being used in the molding of the artificial body wall 10. Some of the mold embodiments require a hard shell in order to prevent permanent deformation or simply to facilitate handling of the mold. In one embodiment, the outer shell is created using a fast set liquid plastic. In other embodiments, the outer shell is created using other materials, such as, for example, plaster and fiberglass. Some molds will be multi-part and, as a result, will have an outer shell so as to facilitate the creation of a tight seal between the edges of the mold.

For a two part or other multi-part molds, the particularities of each structure will require variations, but the principle remains very similar. The first part of a two part mold includes casting of a lumen of a hollow viscera or large vessel. The second part of the two part mold can be created after the thickness of the wall of the structure to be casted is determined, and an equal thickness lining of soft clay is utilized to cover the entire casted structure, preparing for the making of the second part of the mold. When placed together these two parts create a lumen and a wall that preserves anatomical details and thickness.

Figure 4:
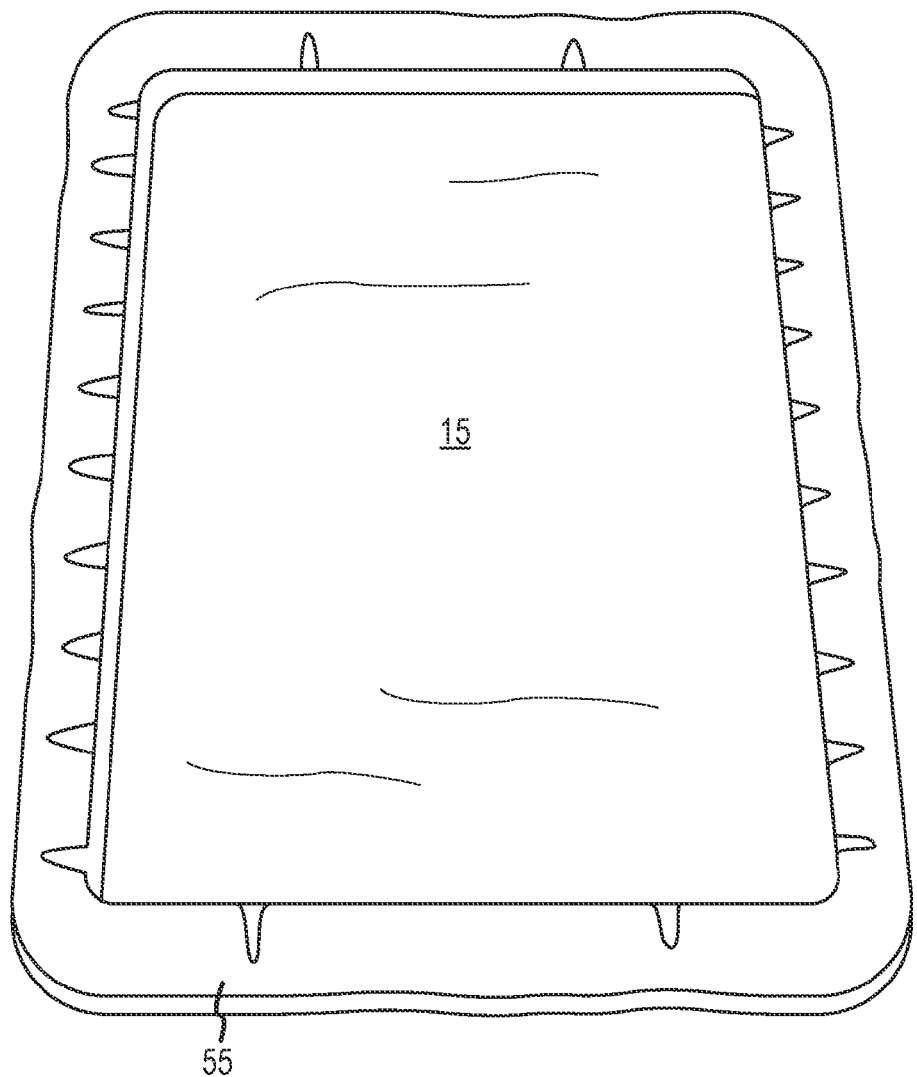
FIG. 4 is a plan view of the mold with the artificial epidermis-dermis layer deposited into the volume of the mold.

As can be understood from FIG. 3, once the mold 55 is provided, the layers of the abdominal wall can then be laid up. For example, as shown in FIG. 4, which is a plan view of the mold 55, the artificial epidermis-dermis layer 15 is poured, sprayed, injected or otherwise deposited into the volume of the mold 55 [block 105].

In one embodiment, the artificial epidermis-dermis layer 15 is formed of a combination of platinum cured room temperature vulcanization silicone rubber ("PCRTVS") durometer Shore A10 (such as, for example Dragon Skin 10®) and PCRTVS durometer Shore OO50 (such as, for example, Ecoflex OO50®), both of which are manufactured by Smooth-on of Easton, Pa. In one embodiment, the combination of PCRTVS A10 and PCRTVS OO50 forms generally the entirety of the composition of the artificial epidermis-dermis layer 15. As can be understood by those skilled in the art, the Shore durometer numbers provided above represent the Shore durometer of the respective cured material. The two Shore durometer scales are "A" and "OO", with the "A" scale going from A10 to A40 for either polyurethane or silicone rubber. A10 is at the softest end of the "A" scale. The "OO" scale is softer than the "A" scale, and OO10 is at the softest end of the "OO" scale.

In other embodiments, the combination of PCRTVS A10 and PCRTVS OO50 is combined with other materials, such as, for example, natural or synthetic fibers in to form the entirety of the composition of the artificial epidermis-dermis layer 15. Examples of such natural or synthetic fibers include wool or animal hair, polyester, nylon, acrylic, rayon, etc. The inclusion of such natural or synthetic fibers into the combination of PCRTVS A10 and PCRTVS OO50 is done to increase the resistance of the cured material to tearing and to decrease its elasticity. In such embodiments employing natural or artificial fibers, the combination of PCRTVS A10 and PCRTVS OO50 will form the majority of the volume of the composition of the artificial epidermis-dermis layer 15, for example, at least 95% of the volume of the final cured material forming the artificial epidermis-dermis layer 15.

In one embodiment, the combination of PCRTVS A10 and PCRTVS OO50 is mixed approximately 50% PCRTVS A10 and 50% PCRTVS OO50 by weight in grams. In one embodiment, the combination of PCRTVS A10 and PCRTVS OO50 is mixed approximately 75% PCRTVS A10 and 25% PCRTVS OO50 by weight in grams. In one embodiment, the combination of PCRTVS A10 and PCRTVS OO50 is mixed approximately 80% PCRTVS A10 and 20% PCRTVS OO50 by weight in grams.

In one embodiment, the combination of PCRTVS A10 and PCRTVS OO50 when fully cured as the artificial epidermis-dermis layer 15 has a Shore durometer of between approximately OO50 to approximately A10. In one embodiment, the combination of PCRTVS A10 and PCRTVS OO50 when fully cured as the artificial epidermis-dermis layer 15 has a Shore durometer of between approximately OO10 to approximately OO50.

Once the artificial epidermis-dermis layer 15 has at least partially cured within the mold 55, the artificial subcutaneous layer 20 is poured, sprayed, injected or otherwise deposited into the volume of the mold 55 over the artificial epidermis-dermis layer [block 110].

In one embodiment, the artificial subcutaneous or fat layer 20 is formed of a combination of one part PCRTVS A10 and another part PCRTVS OO10 (such as, for example, Ecoflex OO10®), PCRTVS OO50 or another PCRTVS between OO10 and OO50, all of which are manufactured by Smooth-on of Easton, Pa. In one embodiment, the combination of PCRTVS A10 and a PCRTVS between approximately OO10 and approximately OO50 forms generally the entirety of the composition of the artificial subcutaneous or fat layer 20.

In other embodiments, the combination of PCRTVS A10 and a PCRTVS between approximately OO10 and approximately OO50 is combined with yet another part in the form of an additive material, such as, for example, Slacker®(tactile mutator as available from Smooth-on of Easton, Pa.) to form the artificial subcutaneous or fat layer 20. The inclusion of this additive material into the combination of PCRTVS A10 and a PCRTVS between approximately OO10 and approximately OO50 is done to decrease the durometer and increase the stickiness/greasiness of the combination forming the artificial subcutaneous or fat layer 20. In such embodiments including the additive material, the combination of PCRTVS A10 (component "A"), a PCRTVS between approximately OO10 and approximately OO50 (component "B"), and an additive, such as, for example, Slacker® (component "C") is mixed by volume as follows: one part A, one part B, and one part C. In another embodiment, the combination of PCRTVS A10 (component "A"), a PCRTVS between approximately OO10 and approximately OO50 (component "B"), and an additive, such as, for example, Slacker® (component "C") is mixed by volume as follows: one part A, one part B, and two parts C. In yet another embodiment, the combination of PCRTVS A10 (component "A"), a PCRTVS between approximately OO10 and approximately OO50 (component "B"), and an additive, such as, for example, Slacker® (component "C") is mixed by volume as follows: one part A, one part B, and three parts C. In yet another embodiment, the combination of PCRTVS A10 (component "A"), a PCRTVS between approximately OO10 and approximately OO50 (component "B"), and an additive, such as, for example, Slacker®(component "C") is mixed by volume as follows: one part A, one part B, and four parts C. Finally, in yet another embodiment, the combination of PCRTVS A10 (component "A"), a PCRTVS between approximately OO10 and approximately OO50 (component "B"), and an additive, such as, for example, Slacker® (component "C") is mixed by volume as follows: one part A, one part B, and four and a half parts C.

Figure 5:
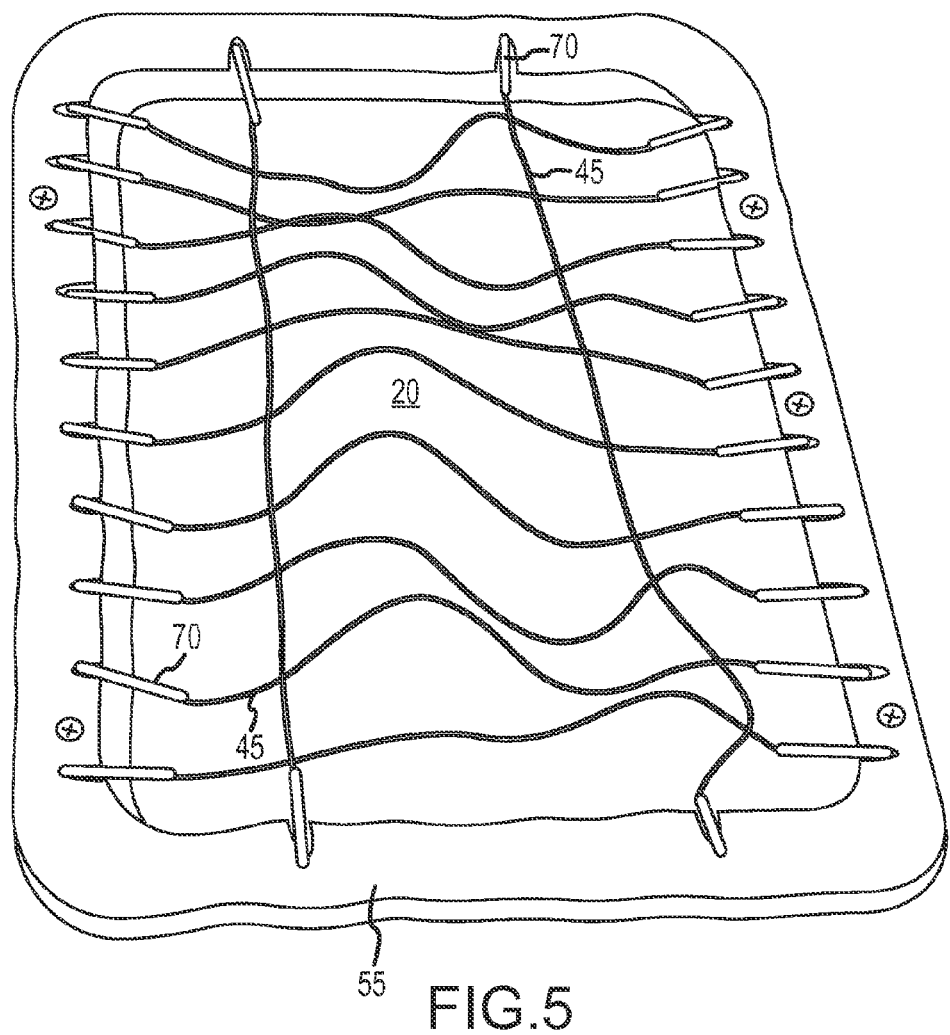
FIG. 5 is the same view of the mold as FIG. 4, except the artificial subcutaneous layer has been deposited over the artificial epidermis-dermis layer and the artificial vessels have been deposited over the artificial subcutaneous layer.

As indicated in FIG. 5, which is the same view as FIG. 4, except further along in the process, once the artificial subcutaneous layer 20 has at least partially cured within the mold 55 over the artificial epidermis-dermis layer 15, artificial vessels 45 are laid over the artificial subcutaneous layer 20 [block 115]. Alternatively, the artificial vessels 45 are laid over the at least partially cured artificial epidermis-dermis layer 15 such that the artificial vessels 45 are located in the immediate subcutaneous space. The artificial subcutaneous layer 20 is then deposited over both the artificial epidermis-dermis layer 15 and the vessels 45, encasing the vessels 45 in the artificial subcutaneous layer 20.

Regardless of when in the process of the vessels 45 are laid down into the mold, the vessels 45 may be laid in a generally random fashion or laid so as to replicate the arrangement of specific major vessels such as, for example, the superficial epigastric and superficial circumflex iliac veins. Each free end of an individual vessel 45 may include a coupling 70 that can be used to couple the free end of an individual vessel 45 to a fluid supply. As will be discussed below, since there are a substantial number of couplings 70, a manifold may be employed to couple the couplings 70 to a fluid source. A discussion regarding artificial vessels 45 and their manufacture is provided below.

In a manner similar that depicted in FIGS. 4 and 5, the vascularized artificial muscle bellies 35 are formed in the volume of another mold [block 120]. Specifically, the polymer material used to form the muscle bellies 35 is poured, sprayed, injected or otherwise deposited into the volume of a mold similar to the mold depicted in FIG. 4. In one embodiment, a first pour is provided similar to the manner discussed above with respect to FIG. 4, after which artificial vessels 45 are laid over the at least partially cured first pour similar to the manner discussed above with respect to FIG. 5. A second pour is then applied over the artificial vessels 45 and first pour, the entirety being allowed to then cure into a unitary vascularized artificial muscle belly 35. In another embodiment, the artificial vessels 45 are laid into the mold and the polymer material used to form the muscle bellies 35 is poured into the mold in a single pour, the polymer material generally engulfing the artificial vessels 45. The entirety is allowed to then cure into a unitary vascularized artificial muscle belly 35.

In one embodiment, the artificial muscle bellies 35 are formed of a combination of PCRTVS OO10 and PCRTVS OO30, both of which are manufactured by Smooth-on of Easton, Pa. In such an embodiment, the combination of PCRTVS OO10 and PCRTVS OO30 is mixed approximately 50% PCRTVS OO10 and 50% PCRTVS OO30 by weight.

In other embodiments, the artificial muscle bellies 35 are formed of either PCRTVS OO10 or PCRTVS OO30. In other words, the mixture is 100% PCRTVS OO10 and 0% PCRTVS OO30, or vice versa. Regardless of whether the artificial muscle bellies 35 are formed of PCRTVS OO10, PCRTVS OO30 or a combination of PCRTVS OO10 and PCRTVS OO30, in one embodiment, these materials, individually or in combination, form generally the entirety of the composition of the artificial muscle bellies 35.

In other embodiments where the artificial muscle bellies 35 are formed of PCRTVS OO10, PCRTVS OO30 or a combination of PCRTVS OO10 and PCRTVS OO30, other materials are also included, such as, for example, Rayon flocking, mixed triturated cured silicone, etc. to form the entirety of the composition of the artificial muscle bellies 35. The inclusion of such other materials into the mix is done to modulate the friability of the cured material and improve its fidelity. In such embodiments employing such other materials, the PCRTVS OO10, PCRTVS OO30 or combination of PCRTVS OO10 and PCRTVS OO30 will form the majority of the volume of the composition of the artificial muscle bellies 35, for example, at least 80% of the volume of the final cured material forming the artificial muscle bellies 35.

In one embodiment, the combination of PCRTVS OO10 and PCRTVS OO30 when fully cured as the artificial muscle bellies 35 has a Shore durometer of between approximately OO10 to approximately OO30.

Figure 6:
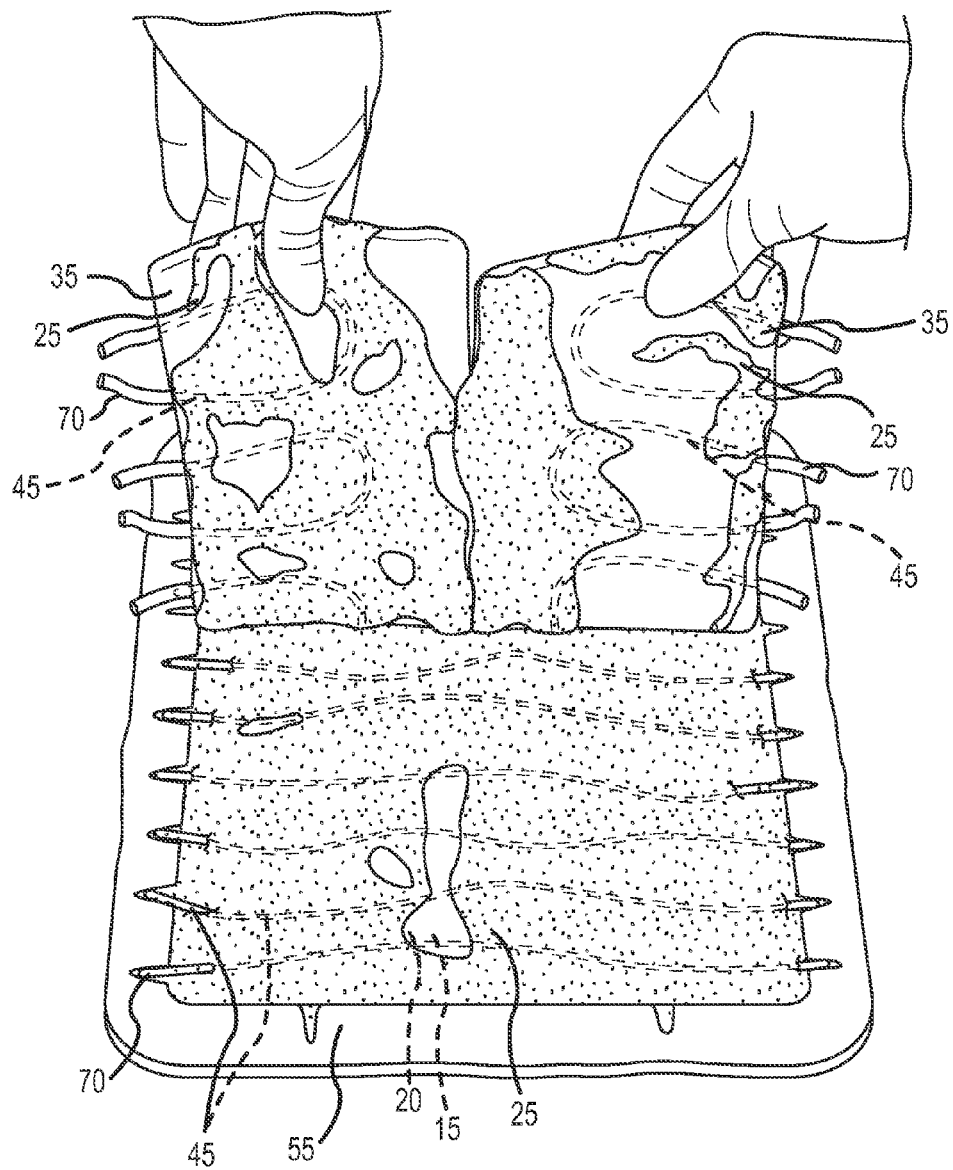
FIG. 6 is the same view of the mold as FIG. 5, except the artificial vascularized muscle bellies are being deposited over the artificial fascia layer, which has been deposited between the artificial vascularized muscle bellies and the artificial vessels and artificial subcutaneous layer.

As shown in FIG. 6, which is the same view as FIG. 5, except further along in the process, the artificial fascia layer 25 is poured, sprayed, injected or otherwise deposited between the cured artificial subcutaneous layer 20 and the artificial muscle bellies 35 [block 125]. The artificial muscle bellies 35 are laid over the artificial subcutaneous layer 20 [block 130]. The artificial fascia layer 25 adheres the artificial muscle bellies 35 to the artificial subcutaneous layer 20.

The respective combinations of polymers used for the muscle bellies 35 and the fascia layer 25 can be used to represent a muscular-tendinous unit and allows the creating of anatomically correct tendon/ligament bone interfaces.

In one embodiment, the artificial fascia layer 25 is formed of a combination of PCRTVS A10 and PCRTVS A20 (Dragon skin 20®), both of which are manufactured by Smooth-on of Easton, Pa. In such an embodiment, the combination of PCRTVS A10 and PCRTVS A20 is mixed approximately 50% PCRTVS A10 and 50% PCRTVS A20 by weight.

In other embodiments, the artificial fascia layer 25 is formed of either PCRTVS A10 or PCRTVS A20. In other words, the mixture is 100% PCRTVS A10 and 0% PCRTVS A20, or vice versa. Regardless of whether the artificial fascia layer 25 is formed of PCRTVS A10, PCRTVS A20 or a combination of PCRTVS A10 and PCRTVS A20, in one embodiment, these materials, individually or in combination, form generally the entirety of the composition of the artificial fascia layer 25.

In other embodiments where the artificial fascia layer 25 is formed of PCRTVS A10, PCRTVS A20 or a combination of PCRTVS A10 and PCRTVS A20, other materials are also included, such as, for example, natural or synthetic fibers, to form the entirety of the composition of the artificial muscle bellies 35. Examples of such natural or synthetic fibers include wool or animal hair, polyester, nylon, acrylic, rayon, etc. The inclusion of such other materials into the mix is done to increase strength the strength of the cured materials and simulate the fibrous nature of the real fascial tissue. In such embodiments employing such other materials, the PCRTVS A10, PCRTVS A20 or combination of PCRTVS A10 and PCRTVS A20 will form the majority of the volume of the composition of the artificial fascia layer 25, for example, at least 95% of the volume of the final cured material forming the artificial fascia layer 25.

In one embodiment, the combination of PCRTVS A10 and PCRTVS A20 when fully cured as the artificial fascia layer 25 has a Shore durometer of between approximately A10 to approximately A20.

Figure 7:
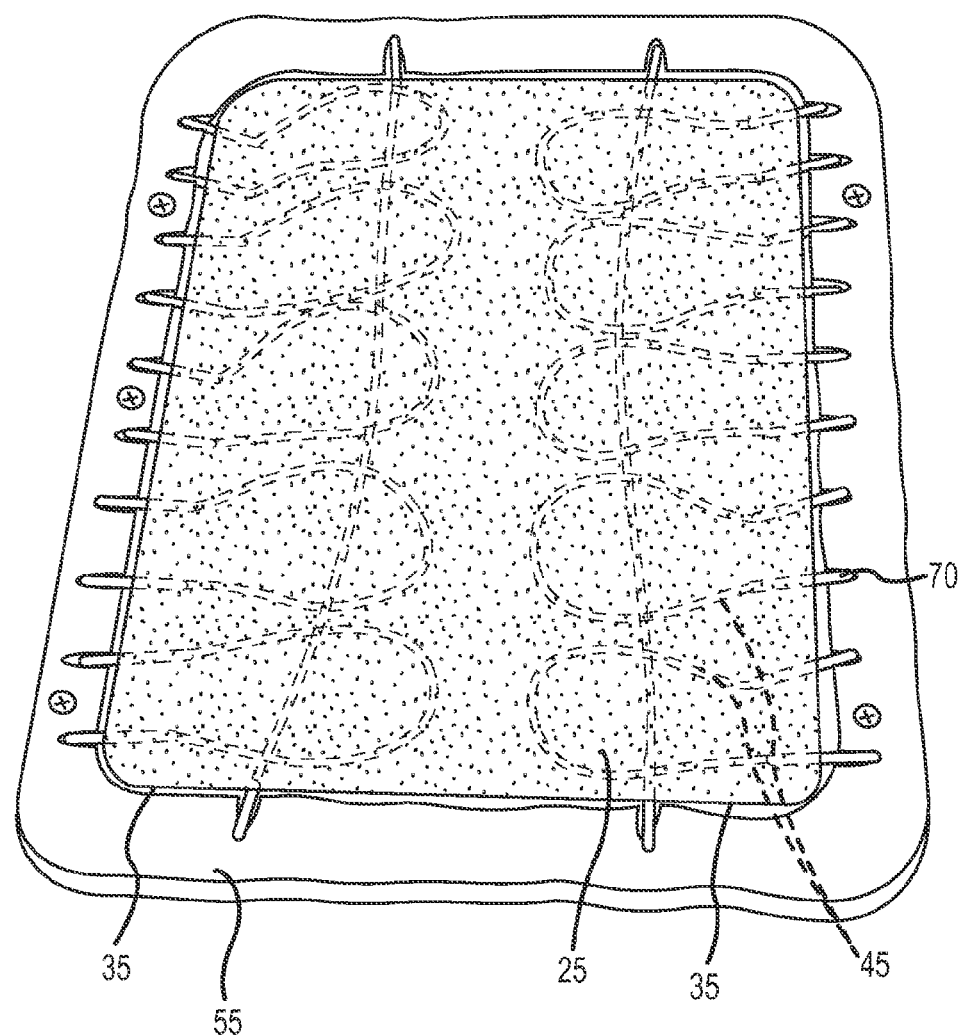
FIG. 7 is the same view of the mold as FIG. 6, except an artificial fascia layer has been deposited over artificial vascularized muscle bellies.

As shown in FIG. 7, which is the same view as FIG. 5, except further along in the process, an artificial fascia layer 25 is poured, sprayed, injected or otherwise deposited on top of the artificial muscle bellies 35 [block 135]. This artificial fascia layer 25 near the inward surface 12 is formed via the same materials and methods described above with respect to the artificial fascia layer 25 deposited between the artificial subcutaneous layer 20 and the artificial muscle bellies 35.

Figure 8:
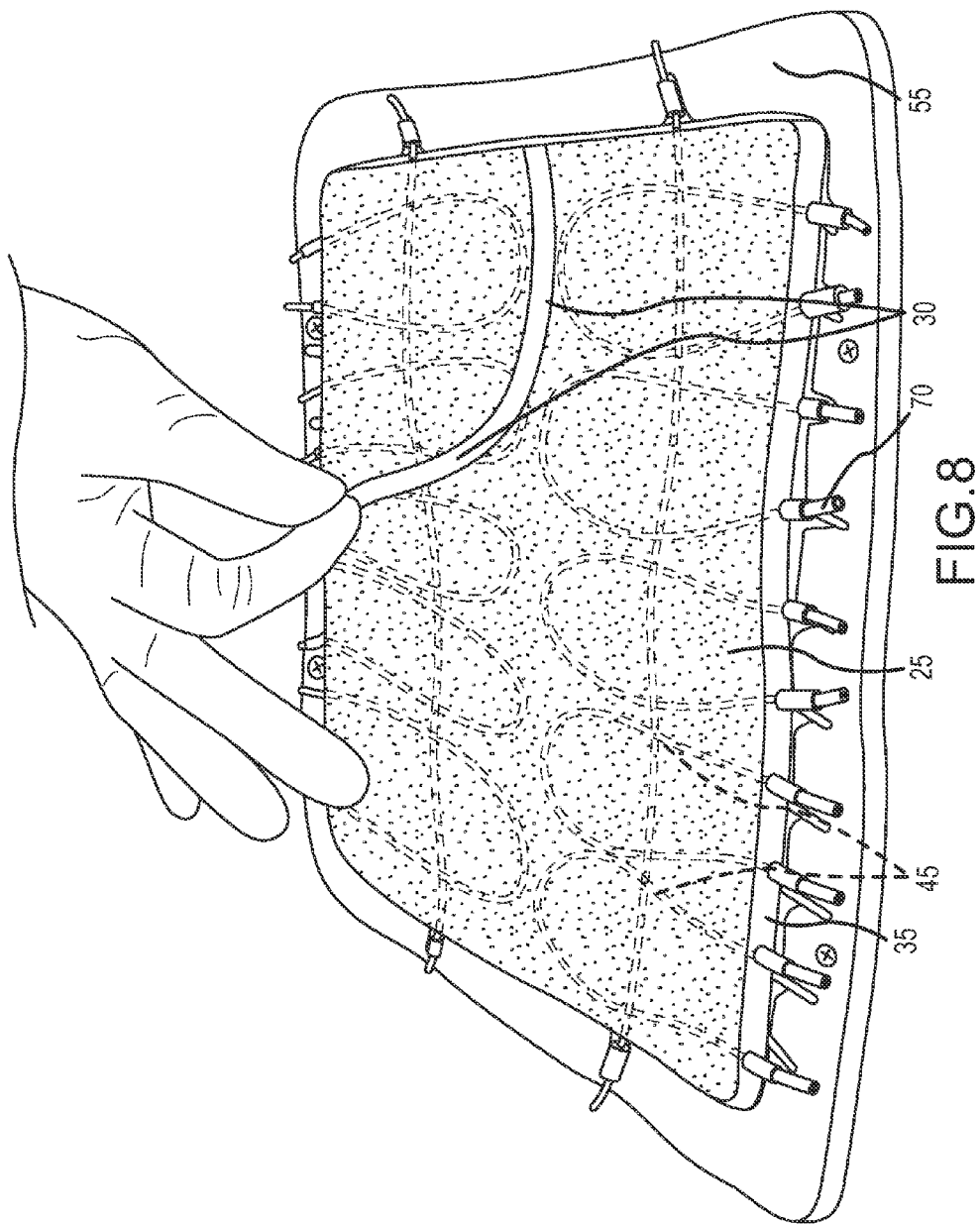
FIG. 8 is a similar view of the mold as FIG. 7, except an artificial abdominal landmark, e.g., linea alba, has been deposited over the artificial fascia layer.

As illustrated in FIG. 8, which is a view similar to that of FIG. 7, except further along in the process, materials are laid, poured, sprayed, injected or otherwise deposited along the space separating the adjacent artificial muscle bellies 35 to form a useful abdominal landmark, namely, the linea alba 30 [block 140]. In one embodiment, the materials used to form the linea alba 30 are as described above with respect to the artificial fascia layer 25.

In one embodiment, an artificial sub-peritoneal fat layer may be deposited over the artificial fascia layer 25 that is near the inward surface 12. If an artificial sub-peritoneal fat layer is provided for the artificial body wall 10, then the sub-peritoneal fat layer will be formulated and applied as explained above with respect to artificial subcutaneous layer 20.

In a final operation, the innermost layer 50 (e.g., artificial peritoneum layer since this example is in the context of an abdominal wall) is poured, sprayed, injected or otherwise deposited over the artificial fascia layer 25 that is near the inward surface 12 or over the sub-peritoneal fat layer that extends over said artificial fascia layer 25, where such a sub-peritoneal fat layer is present [block 145].

In one embodiment, the artificial innermost layer 50 is formed of a silicone thixotropic agent mixed with PCRTVS A10, PCRTVS A20, or PCRTVS OO50, all of which are manufactured by Smooth-on of Easton, Pa. In one embodiment, the thixotropic agent is (Thi-Vex II®) as is manufactured by Smooth-on of Easton, Pa. The inclusion of the thixotropic agent into the PCRTVS A10, PCRTVS A20, or PCRTVS OO50 is done to increase the viscosity of the PCRTVS material in proportion to the amount added, thickening the rubber to a "brush-on" application for forming the artificial innermost layer 50.

Depending on the embodiment, mixtures for the artificial innermost layer 50 are as follows, wherein PCRTVS A10 is component "A", PCRTVS A20 is component "B", PCRTVS OO50 is component "C", and the thixotropic agent is component "D". In one embodiment, the thixotropic agent utilized in each of the following mixtures is the same thixotropic agent. In one embodiment, the thixotropic agent forms no more than approximately 1% of the total weight of the mixture.

COMPONENT A: by weight when mixing, between approximately 1 and 2 parts component A and between approximately $\frac{1}{200}$ and $\frac{1}{100}$ parts component D.

COMPONENT B: by weight when mixing, between approximately 1 and 2 parts component B and between approximately $\frac{1}{200}$ and $\frac{1}{100}$ parts component D.

COMPONENT C: by volume when mixing, between approximately 1 and 2 parts component C and between approximately $\frac{1}{200}$ and $\frac{1}{100}$ parts component D.

In one embodiment of the artificial innermost layer 50, the artificial innermost layer 50 may be mixed as described in the immediately preceding paragraph with respect to each of components A-C, except component D will not be included in any of the mixtures.

In one embodiment of an artificial hollow viscera 45, an artificial peritoneal layer may be applied about the outer circumferential surface of any of the artificial hollow viscera embodiments discussed below with respect to FIGS. 10-13. Such an artificial peritoneal layer applied to the outer circumferential surface of an artificial hollow viscera 45 may be mixed as described immediately above with respect to components A-C, including providing component D in all of the mixtures or, in the alternative, without providing component D in any of the mixtures.

In one embodiment of the artificial innermost layer 50, regardless of whether the artificial innermost layer 50 is formed of PCRTVS A10, PCRTVS A20 or PCRTVS OO50, other materials are also included, such as, for example, natural or synthetic fibers, to form the entirety of the composition of the artificial innermost layer 50. Examples of such natural or synthetic fibers include rayon flocking, etc. The inclusion of such other materials into the mix is done to provide a realistic texture and color for the cured materials. In such embodiments employing such other materials, the PCRTVS A10, PCRTVS A20, or PCRTVS OO50 will form the majority of the volume of the composition of the artificial innermost layer 50, for example, at least 99% of the volume of the final cured material forming the artificial innermost layer 50.

In one embodiment, the material forming the artificial innermost layer 50 when fully cured has a Shore durometer of between approximately OO50 to approximately A20.

In one embodiment, the mixtures described above with respect to the innermost layer 50 can be utilized not only for layer limitations (e.g., sub-peritoneal fat) and serosal coverage of abdominal viscera, but also for creation of mesentery attachments to intestines and omenta or omentum. As an example, this layer can also serve as a conduit for blood vessels that would require ligatures in order to proceed with a small intestinal resection and anastomosis.

For any of the layers 15, 20, 25, 30, 35 and 50 discussed above, colors may also be added to the specific mix to result in a color for the layer that as closely as possible matches the color of the actual tissue being mimicked.

As indicated in FIG. 3, once the artificial inner most layer 50 is deposited over the last deposited artificial fascia and/or sub-peritoneal fat layer 25, the layers 15, 20, 25, 30, 35 and 50 are allowed to cure in the mold 55 into a unitary, artificial body wall 10 [block 150] and, once cured, the artificial body wall 10 is removed from the mold 55 [block 155].

Figure 9:
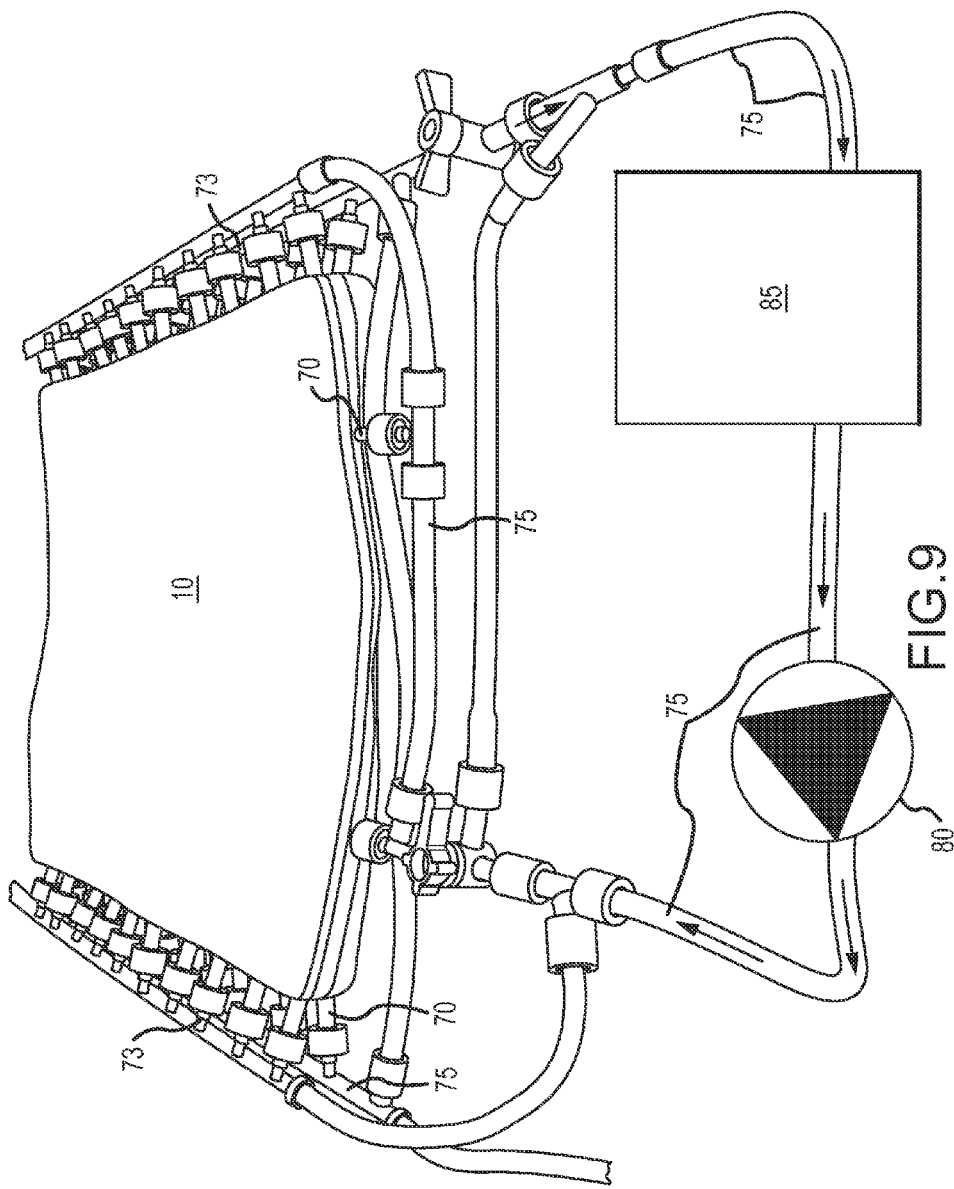
FIG. 9 is a perspective view of a complete artificial body wall fluidly coupled to a fluid supply via fluid conduits.

As illustrated in FIG. 9, which is a perspective view of a complete artificial body wall 10 fluidly coupled to a fluid supply, the couplers 70 leading from the vessels 45 are fluidly coupled to fluid connections of a manifold 73. Fluid conduits 75 extend from the manifold 73 to a pump 80 and fluid reservoir or fluid reservoir alone 85. Where a pump is provided, the pump 80 pressurizes the fluid system such that a fluid, for example, an artificial blood, is caused to flow through the vessels 45 of the artificial body wall 10. Thus, when a vessel 45 within in the artificial body wall 10 is cut in the course of practicing a medical procedure on the artificial body wall 10, the artificial blood will be caused to flow from the cut, resulting in a more realistic learning experience. Where no pump is provided, the reservoir will be elevated sufficiently to provide the head needed to pressurize the fluid system.

The fluid system may include an element that facilitates determining an amount of fluid lost via an opening created in the plurality of lumens. For example, if one or more lumens are cut during a simulated surgical technique on the artificial body wall, a float in a liquid reservoir, a fluid flow meter, or other devices may be used to determine how much fluid has escaped from the cut lumens prior to the cut lumens being sutured closed. Thus, a student practicing a medical technique on the artificial body wall can be evaluated with respect to whether the student allowed too much liquid (e.g., artificial blood) to be lost from the patient during the medical technique.

b. Artificial Vessels and Artificial Hollow Viscera

In other embodiments, artificial tissues may be used to form an artificial anatomical structure such as an artificial vessel or artificial hollow viscera. An artificial vessel or hollow viscera has a lumen wall with a multi-layer configuration that mimics a real lumen wall of a body with respect to types and order of layers, thickness of layers, tactile response, color, and ability to hold a suture.

Real vessels, such as, for example, an artery or vein, have four layers at the microscopic level. Specifically, the layers are a protective fibrous covering, a middle layer of smooth muscle and elastic fibers, and an inner layer of connective tissue lined with a smooth layer of cells. Arteries have a thicker muscle layer to withstand the higher systolic pressures. Veins are wider and adapt to the change in volume of blood.

Real hollow viscera may be in the form of an alimentary system, which is the segment extending from the mouth, passing through the esophagus, stomach, duodenum, jejunum, ileum, cecum and appendix (humans), ascending colon, transverse colon, descending colon, rectum and anus. These hollow viscera all have particular anatomic and histologic features that are a reflection of their functional physiology. What all hollow viscera have in common is some kind of tissue layering that reflects its function.

For the artificial lumens 45 (e.g., vessels and hollow viscera) disclosed herein, the wall thickness and internal diameter vary according to the location where the lumens are to be placed in a larger model, such as, for example, the artificial body wall 10 discussed above or in other body structures, such as, for example, an organ model. Lumen size will also depend on the size of the animal or human being modeled and the function the lumen is supposed to perform. Also, one, two, three or four layers may be necessary depending on the function that such lumen is to perform.

Disclosed below are multilayer imitations of artificial lumens 45 built with different combinations of platinum cured RTV silicone rubbers that have various distinct textures, consistencies and colors resembling with close approximation, the textures, consistencies and colors encountered in organic specimens. Like the artificial body wall 10 disclosed above, the artificial lumens 45 mimic the feeling experienced during surgical situations in live animals or humans.

Figure 10:
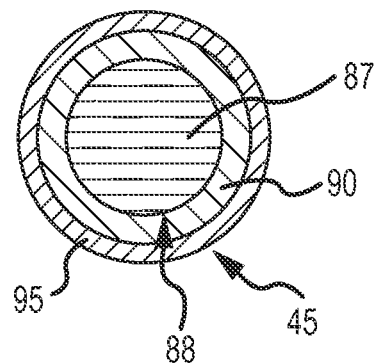
FIG. 10 is a transverse cross section of a mandrel and an artificial vessel being constructed thereon.

As can be understood from FIG. 10, which is a transverse cross section of a mandrel 87 and a multi-layer artificial lumen 45 being constructed thereon, an example method of manufacturing a multi-layer artificial lumen 45 begins by providing a cylindrical mandrel 87 with a smooth outer surface 88. The mandrel may be formed of brass, stainless steel, copper, aluminum, glass, etc. The diameter of the mandrel will depend on the desired diameter for the artificial lumen 45 being laid up on the mandrel.

A release agent is applied to the outer surface 88 of the mandrel. In one embodiment, the release agent is a 1:40 solution of a regular liquid detergent and S-L-X Denatured Alcohol. The release agent on the mandrel 87 is allowed to dry followed by covering the outer circumferential surface of the mandrel with an evenly distributed layer of an aerosolized silicone rubber, creating an innermost layer 90 of the artificial lumen 45.

The application of the aerosolized silicon rubber to the mandrel occurs with the application of heat to the outside surface of the mandrel via, for example, hot air provided by a heat gun or similar source of heated moderate air flow. The application of the aerosolized silicon rubber concomitantly with the application of a moderate flow of continuous hot air accelerates the curing process of the innermost layer 90.

As can be understood from FIG. 10, the next lumen layer 95 is then deposited about the outer circumferential surface of the innermost layer 90 via application of another aerosolized silicon rubber layer in the presence of the heated airflow. The methodology can be repeated as necessary to create artificial lumens having one, two, three, four or more layers of silicon rubber, one or more of the layers having a different Shore durometer number. Once the desired number of layers is laid up and the resulting artificial lumen is adequately cured, the mandrel can be removed from within the completed artificial lumen 45, which may then be used as an artificial vessel or artificial hollow viscera.

In one embodiment, the mandrel is constantly rotated during the depositing of the various layers about the mandrel and during the curing of such layers.

In a first embodiment of an artificial lumen 45, the inner layer 90 is formed of a PCRTVS having a Shore durometer of approximately OO10 and the outer layer is formed of a PCRTVS having a Shore durometer of approximately OO30. In other alternative embodiments, PCRTVS OO10, OO30, OO50, A10 and A20 with additives may be combined similar to as described above with respect to the artificial body wall 10. Specifically, the artificial lumens may employ the above-listed PCRTVS materials in different mixtures and as different layers having different mixtures. Such lumens 45 may be employed as a vessel or hollow viscera. Shore durometer ranges for such lumens may be between approximately OO10 and OO50.

In a second embodiment of an artificial lumen 45, the inner layer 90 has a wall thickness of approximately 0.5 mm, the outer wall layer 95 has a wall thickness of between approximately 0.1 mm and approximately 0.2 mm, the inside diameter of the lumen 45 is approximately 1 mm, and the outside diameter of the lumen 45 is between approximately 2 mm and approximately 2.4 mm. In such an embodiment, the inner layer 90 may be formed of a material such as a super soft platinum-catalyzed silicone rubber having a Shore durometer of approximately OO30 and available from Smooth-on of Easton, Pa. under the tradename of Ecoflex OO30. In such an embodiment, the outer layer 95 may be formed of a material such as a platinum silicone rubber paint base available from Smooth-on of Easton, Pa. under the tradename of Psycho Paint. Such a lumen 45 may be employed as a vessel.

In a third embodiment of an artificial lumen 45, the inner layer 90 has a wall thickness of approximately 1 mm, the outer wall layer 95 has a wall thickness of approximately 0.5 mm, the inside diameter of the lumen 45 is approximately 2 mm, and the outside diameter of the lumen 45 is approximately 5 mm. In such an embodiment, the inner layer 90 may be formed of a material such as a super soft platinum-catalyzed silicone rubber having a Shore durometer of approximately OO30 and available from Smooth-on of Easton, Pa. under the tradename of Ecoflex OO30. In such an embodiment, the outer layer 95 may be formed of a material such as a platinum silicone rubber paint base available from Smooth-on of Easton, Pa. under the trade name of Psycho Paint. Such a lumen 45 may be employed as a vessel.

In a fourth embodiment of an artificial lumen 45, the inner layer 90 has a wall thickness of approximately 0.5 mm, the outer wall layer 95 has a wall thickness of between approximately 0.2 mm and approximately 0.3 mm, the inside diameter of the lumen 45 is approximately 1 mm, and the outside diameter of the lumen 45 is between approximately 2.4 mm and approximately 2.6 mm. In such an embodiment, the inner layer 90 may be formed of a material such as a super soft platinum-catalyzed silicone rubber having a Shore durometer of approximately OO30 and a available from Smooth-on of Easton, Pa. under the tradename of Ecoflex OO30. In such an embodiment, the outer layer 95 may be formed of a material such as a platinum silicone rubber paint base available from Smooth-on of Easton, Pa. under the tradename of Psycho Paint. Such a lumen 45 may be employed as a vessel.

In a fifth embodiment of an artificial lumen 45, the inner layer 90 has a wall thickness of approximately 3 mm, the outer wall layer 95 has a wall thickness of approximately 0.5 mm, the inside diameter of the lumen 45 is approximately 10 mm, and the outside diameter of the lumen 45 is approximately 17 mm. In such an embodiment, the inner layer 90 may be formed of a material such as a super soft platinum-catalyzed silicone rubber having a Shore durometer of approximately OO10 and available from Smooth-on of Easton, Pa. under the tradename of Ecoflex OO10. In such an embodiment, the outer layer 95 may be formed of a material such as a platinum silicone rubber having a Shore durometer of approximately OO30 and available from Smooth-on of Easton, Pa. under the tradename of Ecoflex OO30. Such a lumen 45 may be employed as a vessel.

Figure 11:
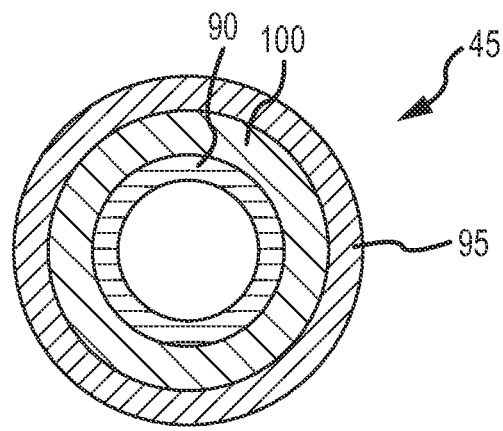
FIG. 11 is a transverse cross section of a three-layer artificial lumen.

As can be understood form FIG. 11, which is a transverse cross section of a sixth embodiment of a multi-layer artificial lumen 45, the inner layer 90 has a wall thickness of approximately 1 mm, a middle layer 100 has a wall thickness of approximately 2 mm, the outer wall layer 95 has a wall thickness of approximately 1 mm the inside diameter of the lumen 45 is approximately 4 mm, and the outside diameter of the lumen 45 is approximately 12 mm. In such an embodiment, the middle layer 100 may be formed of a material such as a super soft platinum-catalyzed silicone rubber having a Shore durometer of approximately OO10 and available from Smooth-on of Easton, Pa. under the tradename of Ecoflex OO10. In such an embodiment, the inner layer 90 and outer layer 95 may be formed of a material such as a platinum silicone rubber paint base available from Smooth-on of Easton, Pa. under the tradename of Psycho Paint. Such a lumen 45 may be employed as a vessel.

Figure 12:
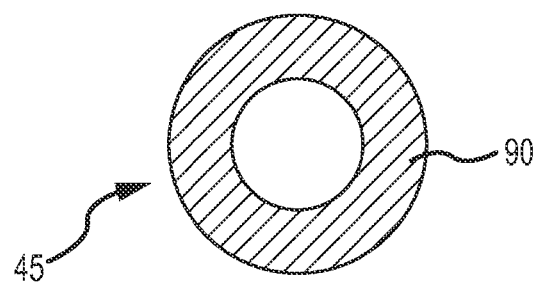
FIG. 12 is a transverse cross section of a single layer artificial lumen.

As can be understood from FIG. 12, which is a transverse cross section of a single layer artificial lumen 45, the only layer 90 of the lumen 45 has a wall thickness of approximately 1 mm, an inside diameter of the lumen 45 is approximately 2 mm, and an outside diameter of the lumen 45 is approximately 4 mm. In such an embodiment, the only layer 90 may be formed of a material such as a super soft platinum-catalyzed silicone rubber having a Shore durometer of approximately OO30 and available from Smooth-on of Easton, Pa. under the tradename of Ecoflex. Such a lumen 45 may be employed as a vessel.

Figure 13:
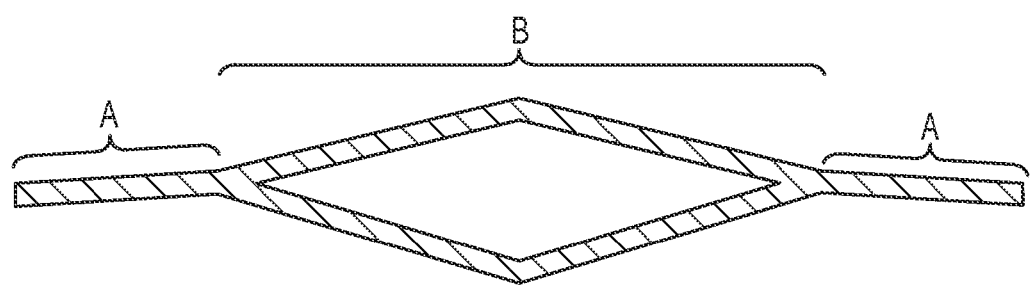
FIG. 13 is a plan view of different types of lumens joined together to form branches.

As indicated in FIG. 13, which is a plan view of different types of lumens joined together to form branches, a single artificial lumen 45 transitions into parallel artificial lumens 45 and back into a single artificial lumen 45. In one embodiment, the single artificial lumens at A in FIG. 13 are the single layer artificial lumen 45 discussed above with respect to FIG. 12. The parallel artificial lumens at B in FIG. 13 are the fourth embodiment of the multi-layer lumens 45 discussed above. Such a network of lumens 45 as depicted in FIG. 13 are advantageous for use as a network of vessels to be avoided or dealt with by the student/trainee in the event of damage during the simulated surgical approach.

The artificial lumens disclosed herein offer limited elasticity and distention, the capacity for supporting several punctures and to resist tearing when manipulated with surgical instruments and when a ligature is placed. When employed as vessels 45 in the artificial body wall 45, the lumens 45 are not easily distinguished from surrounding tissues being cut, which brings a higher degree of fidelity to the models that are intended to bleed once an incision is performed. As vessels 45 in an artificial body wall 10, the vessels allow the artificial body wall to respond more realistic to surgical interventions by actively bleeding or oozing artificial blood or serum. The vessels 45 can be clamped and ligated.

When the lumens 45 are applied as hollow viscera 45 in a body trunk model similar to those discussed below, the lumens 45 can allow realistic anastomosis, enterotomies and removal of specific portions of the viscus as commonly performed for appendectomies in humans and small intestinal resection and anastomosis in horses and other domestic animals.

Although the present invention has been described with reference to preferred embodiments, persons skilled in the art will recognize that changes may be made in form and detail without departing from the spirit and scope of the invention.

What is claimed is:

1. An artificial body wall comprising: a first layer comprising a silicone rubber comprising a mixed combination comprising a platinum cured room temperature vulcanization silicone rubber ("PCRTVS") having a Shore durometer of A10 and a PCRTVS having a Shore durometer of OO50.

2. The artificial body wall of claim 1, wherein the PCRTVS having a Shore durometer of A10 forms between approximately 50% and approximately 80% of the mixed combination, the PCRTVS having a Shore durometer of OO50 forming approximately the rest of the mixed combination.

3. The artificial body wall of claim 1, wherein the first layer has a cured Shore durometer of between approximately OO50 and A10.

4. The artificial body wall of claim 1, further comprising a second layer visually distinct from, and extending along, the first layer, the second layer comprising a silicone rubber comprising a mixed combination comprising a first component comprising PCRTVS having a Shore durometer of A10 and a second component comprising a PCRTVS having a Shore durometer of between approximately OO10 and approximately OO50.

5. The artificial body wall of claim 1, wherein the first layer is an artificial epidermis-dermis layer and the second layer is an artificial subcutaneous layer extending below the artificial epidermis-dermis layer.

6. The artificial body wall of claim 4, wherein the silicone rubber of the second layer further includes a third component having a tactile mutator.

7. The artificial body wall of claim 6, wherein the mixed combination of the silicone rubber of the second layer comprises approximately one part of the first component, approximately one part of the second component, and between approximately one part and approximately four and a half parts of the third component.

8. An artificial body wall comprising: a first layer comprising a silicone rubber comprising a mixed combination comprising a platinum cured room temperature vulcanization silicone rubber ("PCRTVS") having a Shore durometer of A10 and a PCRTVS having a Shore durometer of A20.

9. The artificial body wall of claim 8, wherein the PCRTVS having a Shore durometer of A10 forms approximately 50% of the mixed combination and the PCRTVS having a Shore durometer of A20 forms approximately 50% of the mixed combination.

10. The artificial body wall of claim 8, wherein the PCRTVS having a Shore durometer of A10 forms approximately 100% of the mixed combination or the PCRTVS having a Shore durometer of A20 forms approximately 100% of the mixed combination.

11. The artificial body wall of claim 8, wherein the first layer has a cured Shore durometer of between approximately A10 and approximately A20.

12. The artificial body wall of claim 8, further comprising a second layer visually distinct from, and extending along, the first layer, the second layer comprising a silicone rubber comprising a mixed combination comprising a PCRTVS having a Shore durometer of OO10 and a PCRTVS having a Shore durometer of OO30.

13. The artificial body wall of claim 12, wherein the first layer is an artificial fascia layer and the second layer is an artificial muscle layer at least one of: extending along and below the artificial fascia layer; or extending between first and second layers of the artificial fascia layer.

14. The artificial body wall of claim 12, wherein the PCRTVS having a Shore durometer of OO10 forms approximately 50% of the mixed combination and the PCRTVS having a Shore durometer of OO30 forms approximately 50% of the mixed combination.

15. The artificial body wall of claim 12, wherein the PCRTVS having a Shore durometer of OO10 forms approximately 100% of the mixed combination or the PCRTVS having a Shore durometer of OO30 forms approximately 100% of the mixed combination.

16. The artificial body wall of claim 12, wherein the second layer has a cured Shore durometer of between approximately OO10 and approximately OO30.

17. The artificial body wall of claim 8, wherein the first layer is an artificial linea alba layer.

18. An artificial body wall comprising: a first layer comprising a silicone rubber comprising a mixed combination comprising at least one of a platinum cured room temperature vulcanization silicone rubber ("PCRTVS") having a Shore durometer of A10, a PCRTVS having a Shore durometer of A20, a PCRTVS having a Shore durometer of OO50, or a thixotropic agent.

19. The artificial body wall of claim 18, wherein the mixed combination comprises one of the following:
   a) between approximately one part to approximately two parts the PCRTVS having a Shore durometer of A10 and between approximately $\frac{1}{200}$ part and approximately $\frac{1}{100}$ part the thixotropic agent;
   b) between approximately one part to approximately two parts the PCRTVS having a Shore durometer of A20 and between approximately $\frac{1}{200}$ part and approximately $\frac{1}{100}$ part the thixotropic agent; and
   c) between approximately one part to approximately two parts the PCRTVS having a Shore durometer of OO50 and between approximately $\frac{1}{200}$ part and approximately $\frac{1}{100}$ part the thixotropic agent.

20. The artificial body wall of claim 18, wherein the first layer comprises at least one of an artificial peritoneum layer, an artificial pleura layer or an artificial sub-peritoneal fat layer.

21. An artificial body wall comprising: a layer comprising a silicone rubber and vascularized with a plurality of lumens comprising platinum cured room temperature vulcanization silicone rubber ("PCRTVS").

22. The artificial body wall of claim 21, wherein at least one lumen of the plurality of lumens comprises a multi-layer configuration of at least one of the following:
   a) an inner lumen layer comprising a PCRTVS having a Shore durometer of OO10 and an outer lumen layer circumferentially extending about the inner lumen layer and comprising a PCRTVS having a Shore durometer of OO30;
   b) an inner lumen layer comprising a platinum-catalyzed silicone rubber having a Shore durometer of OO30 and an outer lumen layer circumferentially extending about the inner lumen layer and comprising a platinum silicone rubber paint base;
   c) an inner lumen layer comprising a platinum-catalyzed silicone rubber having a Shore durometer of OO10 and an outer lumen layer circumferentially extending about the inner lumen layer and comprising a platinum-catalyzed silicone rubber having a Shore durometer of OO30; or
   d) a middle lumen layer comprising a platinum-catalyzed silicone rubber having a Shore durometer of OO10 and inner and outer lumen layers circumferentially sandwiching the middle lumen layer, both of the inner and outer lumen layers comprising platinum silicone rubber paint base.

23. The artificial body wall of claim 21, further comprising means for fluidly pressurizing the plurality of lumens, the means comprising at least one of a pumping mechanism or a fluid reservoir.

24. The artificial body wall of claim 21, further comprising an element that facilitates determining an amount of fluid lost via an opening created in the plurality of lumens.

25. A method of manufacturing an artificial body wall, the method comprising molding a layer comprising a silicone rubber comprising at least one of the following:
   a) a mixed combination comprising a platinum cured room temperature vulcanization silicone rubber ("PCRTVS") having a Shore durometer of A10 and a PCRTVS having a Shore durometer of OO50;
   b) a mixed combination comprising a first component having a PCRTVS having a Shore durometer of A10 and a second component having a PCRTVS having a Shore durometer of between approximately OO10 and approximately OO50;
   c) a mixed combination comprising a PCRTVS having a Shore durometer of A10 and a PCRTVS having a Shore durometer of A20; or
   d) a mixed combination comprising a PCRTVS having a Shore durometer of OO10 and a PCRTVS having a Shore durometer of OO30.

26. The method of claim 25, wherein the silicone rubber comprises the mixed combination of b) and further comprises a third component having a tactile mutator.

27. A method of manufacturing an artificial body wall, the method comprising molding a layer comprising a silicone rubber comprising at least one of the following:
   a) a mixed combination comprising a platinum cured room temperature vulcanization silicone rubber ("PCRTVS") having a Shore durometer of A10;
   b) a mixed combination comprising a PCRTVS having a Shore durometer of A20;
   c) a mixed combination comprising a PCRTVS having a Shore durometer of OO50; or
   d) a mixed combination comprising a thixotropic agent.

28. A method of manufacturing an artificial body wall, the method comprising manufacturing the artificial body wall from a silicone rubber, wherein the artificial body wall is vascularized with a plurality of lumens comprising platinum cured room temperature vulcanization silicone rubber ("PCRTVS").

29. The method of claim 28, wherein at least one lumen of the plurality of lumens comprises a multi-layer configuration of different types of PCRTVS.

* * * * *